(12) United States Patent
Iechika et al.

(10) Patent No.: US 6,273,569 B1
(45) Date of Patent: Aug. 14, 2001

(54) ILLUMINATING OPTICAL SYSTEM AND PROJECTOR

(75) Inventors: Hisashi Iechika, Shiojiri; Toshiaki Hashizume, Okaya, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/469,265

(22) Filed: Dec. 22, 1999

(30) Foreign Application Priority Data

Dec. 25, 1998 (JP) .................................................. 10-368747

(51) Int. Cl.⁷ ..................................................... G03B 21/14
(52) U.S. Cl. ................................................. 353/38; 353/20
(58) Field of Search .................................. 353/20, 38, 31, 353/33, 34, 37; 349/8, 9, 5

(56) References Cited

U.S. PATENT DOCUMENTS

| | | | |
|---|---|---|---|
| 5,865,521 | * 2/1999 | Hashizume et al. | 353/38 |
| 5,978,136 | * 11/1999 | Ogawa et al. | 353/20 |
| 6,028,703 | * 2/2000 | Sekine et al. | 353/20 |
| 6,036,318 | * 3/2000 | Itoh | 353/20 |
| 6,062,695 | * 5/2000 | Kakuda et al. | 353/20 |
| 6,067,193 | * 5/2000 | Sekine et al. | 353/20 |
| 6,092,901 | * 7/2000 | Hashizume et al. | 353/20 |

\* cited by examiner

*Primary Examiner*—William Dowling
(74) *Attorney, Agent, or Firm*—Oliff & Berridge, PLC

(57) ABSTRACT

The invention concerns improving the efficiency with which light being used in a polarization conversion optical system used in an illuminating optical system. An illuminating optical system includes a light source for emitting unpolarized light, a separation optical system for separating the light emitted from the light source into a plurality of partial light beams, and a polarization conversion optical system for substantially converting the unpolarized partial light beams into one type of linearly polarized light beams whose polarization directions are aligned and causing the one type of linearly polarized light beams to leave therefrom. In the illuminating optical system, the separation optical system includes a first lens array having an M column (M is an integer equal to or greater than 2) of small lenses, and a second lens array having an N column (N is an integer equal to or greater than 1 and less than M) of small lenses. In addition, the separation optical system is constructed such that the partial light beams formed in a plurality of columns at the plurality of small lens columns in the first lens array are collected in a smaller number of columns in order to strike the second lens array, whereby the partial light beams separated at the M column of small lenses in the first array are incident upon the N column of small lenses in the second lens array.

16 Claims, 9 Drawing Sheets

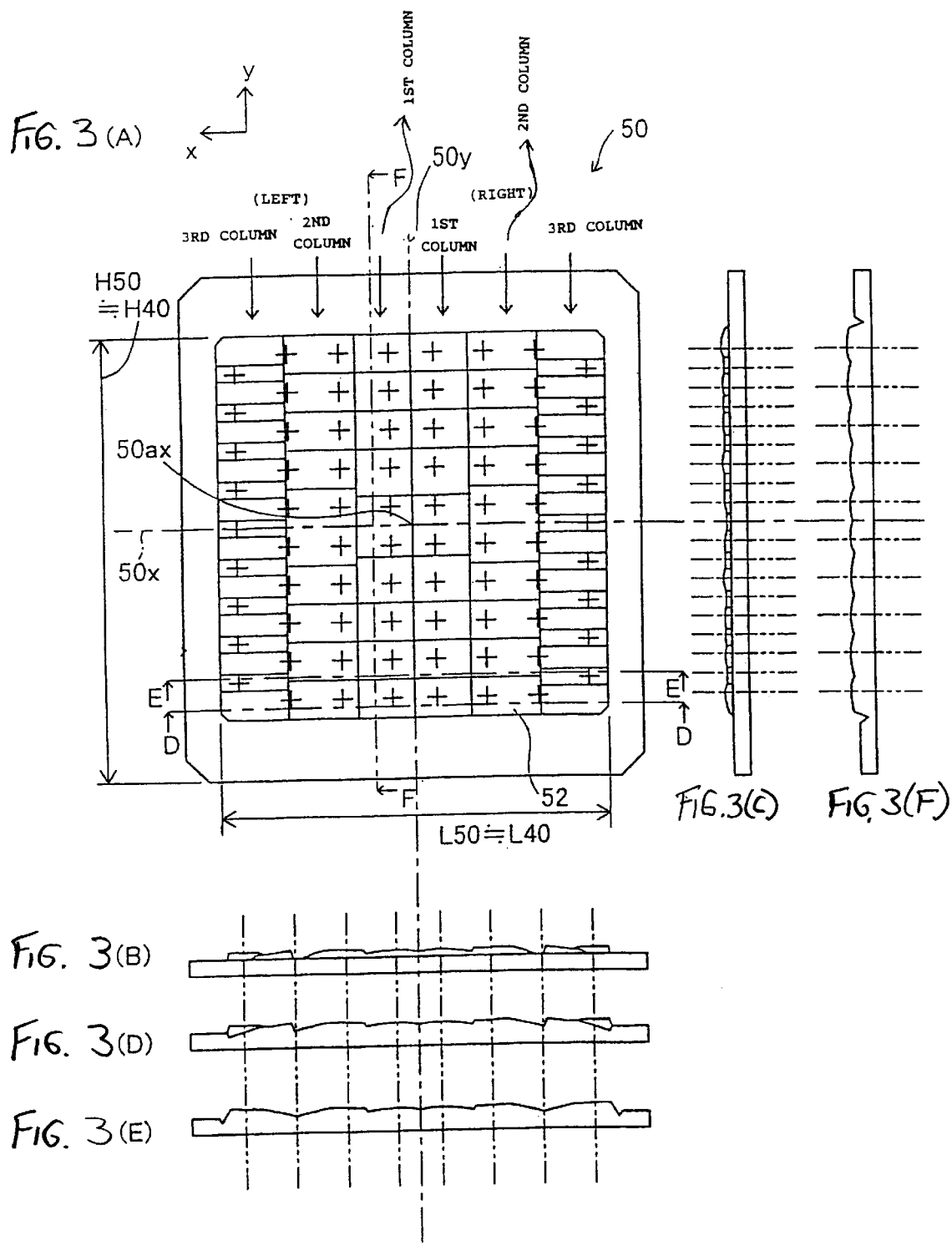

ILLUMINATING OPTICAL SYSTEM AND PROJECTOR

BACKGROUND OF THE INVENTION

1. Field of Invention

The present invention relates to an illuminating optical system for virtually superimposing partial light beams onto the same illumination area after separating light emitted from a light source into partial light beams. In addition, the present invention relates to a projector which can display a uniform and bright image using the illuminating optical system.

2. Description of Related Art

In the projector, illuminating light shed upon an electro-optical device called a light valve is modulated in accordance with information of an image which one wants to display, and the modulated light is projected onto a screen to display the image. It is preferable that the image displayed by such a projector be uniform and bright, and that the efficiency with which light is used by the illuminating optical system applied to the projector be high.

As electro-optical devices, liquid crystal panels (liquid crystal light valves) of the type which modulate only one type of linearly polarized light are often used. When such liquid crystal panels are illuminated with unpolarized illuminating light, only one of the two types of linearly polarized light, perpendicular to each other, contained in the unpolarized illuminating light is used, so that the other type of linearly polarized light is not used. Therefore, when an illuminating optical system which emits unpolarized illuminating light is applied to a projector which uses the above-described liquid crystal panel, the efficiency with which illuminating light is used is reduced. To overcome this problem, there has hitherto been used an illuminating optical system using a polarization conversion optical system which converts unpolarized light emitted from the light source into one type of linearly polarized light.

Ordinarily, the intensity of light beams emitted from a light source is highest near the optical axis of the light source and tends to decrease as the distance from the optical axis increases. When such light beams are used as illuminating light beams, a non-uniform image is displayed at the projector. To overcome this problem, an integrator optical system has hitherto been used as an optical system for uniformly illuminating a liquid crystal panel acting as illumination area.

FIG. 9 is a schematic structural view of a conventional illuminating optical system. The illuminating optical system comprises a light source 4120, a first lens array 4130, a second lens array 4140, a polarization conversion optical system 4150, and a superimposing lens 4160. The two lens arrays 4130 and 4140, and the superimposing optical system (superimposing lens) 4160 form an integrator optical system.

The first lens array 4130 includes a plural number of small lenses 4132. The second lens array 4140 includes a plural number of small lenses 4142 in correspondence with the plural number of small lenses 4132 of the first lens array 4130.

The polarization conversion optical system 4150 comprises a plurality of sets of a polarization separation film 4152 and a reflective film 4154 disposed in the x-axis direction, with each polarization separation film 4152 being formed parallel to its associated reflective film 4154. The polarization separation films 4152 and the reflective films 4154 are tilted by a certain amount with respect to the xy plane. A λ/2 phase film 4156 is provided at the light-outgoing side of each polarization separation film 4152.

The substantially parallel light beams emitted from the light source 4120 are separated into a plural number of partial light beams by the plurality of small lenses 4132 of the first lens array 4130. By the light condensing action of the small lenses 4132 of the first lens array 4130, the separated partial light beams are condensed near the small lenses 4142 of the second lens array 4140 and the polarization separation films 4152 of the polarization conversion optical system 4150. Of the components of the condensed light incident upon the polarization separation films 4152, one of the types of linearly polarized light component (for example, the p-polarized light component) is transmitted through the polarization separation films 4152, while the other type of linearly polarized light component (for example, the s-polarized light component) is reflected by the polarization separation films 4152. The other type of linearly polarized light component reflected by the polarization separation films 4152 is reflected by the reflective films 4154 and falls upon the superimposing optical system 4160. On the other hand, the one type of linearly polarized light component transmitted through the polarization separation films 4152 is incident upon the λ/2 phase films 4156 and is converted into a linearly polarized light component which has the same polarization direction as the other type of linearly polarized light component in order to strike the superimposing optical system 4160. The plurality of partial light beams which have struck the superimposing optical system 4160 are each virtually superimposed on an illumination area 4180. This allows substantially one type of linearly polarized light to illuminate the illumination area 4180.

In the above-described conventional illuminating optical system, the substantially parallel partial light beams separated by the first lens array 4130 are condensed so that they are incident upon the polarization separation films 4152. As a result, the partial light beams incident upon the polarization separation films 4152 are spatially separated from each other. The reflective films 4154 are disposed at locations where the partial light beams from the second lens array 4140 do not fall directly thereupon, and reflect the linearly polarized light component reflected by the polarization separation films 4152. Accordingly, the unpolarized light emitted from the light source is separated into two types of linearly polarized light beams by the polarization separation films 4152 and the reflective films 4154.

If the light beams emitted from the light source 4120 are ideal parallel light beams, the partial light beams to be condensed near the polarization separation films 4152 are condensed virtually at one point. However, actual light sources are not point light sources, so that the light beams emitted from the light source 4120 are not completely parallel, causing the partial light beams to form images which are spread by a certain amount. In order to convert unpolarized light emitted from the light source 4120 into virtually one type of linearly polarized light more efficiently, most of each of the partial light beams is made to fall upon its associated polarization separation film 4152. Here, the second lens array 4140 and the polarization conversion optical system 4150 are disposed so that they are virtually in close contact with each other. Therefore, it can be said that the light-outgoing surface of the second lens array 4140 and the light-incoming surface of the polarization conversion optical system 4150 virtually coincide. Consequently, in order to cause most of each of the partial light beams to fall upon its associated polarization separation film 4152, the x-axis direction width of each polarization separation film 4152 and each reflective film 4154 can be made equal to or greater than the x-axis direction width of its associated image formed by condensing each of the partial light beams.

For a projection lens (projection optical system) used in the projector, there is an incident angle limit value (maximum value) allowing effective projection of incident light. The incident angle limit value is called the swallow angle. The swallow angle is made large by using a lens with a small f-number. However, using a lens with a small f-number increases, for example, the size and cost of the projector, so that it is preferable to use a lens with a large f-number as projection lens. In other words, in the projector, it is preferable that the incident angle of light which strikes the liquid crystal panel, the projection lens, or any other optical device disposed at the back side of the illuminating optical system be small. Therefore, ordinarily, the characteristics of each optical element are often determined based on the projection lens used.

When a decision is made as to the projection lens to be used, the swallow angle is determined. Since there is a limit as to the size of the entire projector, the distance between the illumination area 4180 and the superimposing optical system 4160 is limited to a value equal to or less than a certain value. Therefore, when an attempt is made to gather as much illuminating light as possible within the swallow angle of the projection lens, the limit value of the x-axis direction width of the polarization conversion optical system 4150 is determined. When the x-axis direction width of the polarization conversion optical system 4150 is set equal to or less than this limit value, the x-axis direction width of the polarization separation films 4152 and that of the reflective films 4154 may become considerably smaller than the x-axis direction width of the images formed by condensing light. In such a case, the unpolarized light emitted from the light source cannot be efficiently converted into virtually one type of linearly polarized light.

SUMMARY OF THE INVENTION

To overcome the above-described conventional problem, it is an object of the present invention to provide a technology which allows an illuminating optical system to use light with greater efficiency as a result of improving the efficiency with which light is used by a polarization conversion optical system. It is also an object of the present invention to make it possible to obtain a uniform and brighter projected image in a projector.

To at least partly overcome the above-described problem, according to the present invention, there is provided an illuminating optical system for illuminating a light-incoming surface acting as illumination area of a predetermined optical device, the illuminating optical system that may include a light source for emitting unpolarized light, a separation optical system for separating the light emitted from the light source into a plurality of partial light beams, and a polarization conversion optical system for substantially converting the unpolarized partial light beams into one type of linearly polarized light beams whose polarization directions are aligned and causing the one type of linearly polarized light beams to leave therefrom.

The separation optical system may also include a first lens array having an M column (M is an integer equal to or greater than 2) of small lenses, and a second lens array having an N column (N is an integer equal to or greater than 1 and less than M) of small lenses. In addition, the separation optical system may be constructed such that the partial light beams formed in a plurality of columns at the plurality of small lens columns in the first lens array are collected in a smaller number of columns in order to strike the second lens array, whereby the partial light beams separated at the M column of small lenses in the first lens array are incident upon the N column of small lenses in the second lens array.

According to the above-described illuminating optical system, it is possible to make the partial light beams separated at the M columns of small lenses of the first lens array to fall upon the N columns of small lenses of the second lens array. This allows the efficiency with which light strikes the polarization conversion optical system to be improved, making it possible for the polarization conversion optical system to use light with greater efficiency than has been conventionally possible. Thus, the efficiency with which light is used in the illuminating optical system can be improved.

Here, it is preferable that the number of small lenses in the first lens array be equal to the number of small lenses in the second lens array. This allows light to strike the polarization conversion optical system with even greater efficiency.

In the above-described illuminating optical systems, it is preferable that the first lens array and the second lens array be about the same size. This allows the polarization conversion optical system to use light with greater efficiency than has been conventionally possible, with the size of the illuminating optical system being kept substantially the same as the size of the conventional illuminating optical system.

In the above-described illuminating optical systems, it is preferable that the plurality of small lens columns in the first lens array be disposed in correspondence with an outermost side of the N column of small lenses. When the illuminating optical system is constructed in this way, the polarization conversion optical system can use light with greater efficiency than has been conventionally possible.

It is preferable that the plurality of small lens columns in the first lens array comprise two small lens columns. The position of each small lens in the outer column of the two columns of small lenses may be separated from the position of its associated small lens in the inner column of the two columns, in the direction of a column, and in one column of small lenses in the second lens array corresponding to the two columns of small lenses in the first lens array, first small lenses corresponding to the small lenses in the outer column in the first lens array and second small lenses corresponding to the small lenses in the inner column be alternately disposed. When the illuminating optical system is constructed in this way, the polarization conversion optical system can use light with greater efficiency than has been conventionally possible.

Each of the above-described illuminating optical systems of the present invention can be used as an illuminating optical system of a projector. The projector of the present invention may include any one of the above-described illuminating optical systems, an electro-optical device having a light-incoming surface acting as the illumination area, the electro-optical device being provided for modulating in accordance with image information incident light coming from the illuminating optical system, and a projection optical system for projecting the modulated light obtained at the electro-optical device.

As described above, the illuminating optical system of the present invention allows light to be used with greater efficiency than has been conventionally possible. Therefore, the projector incorporating any one of the illuminating optical systems of the present invention allows the brightness of the projected image to be increased.

The illuminating optical system of the present invention includes an integrator optical system, or a separation optical system, so that even when the light intensity within the section of the light beams emitted from the light source is greatly distributed towards one side, it is possible to obtain a uniformly bright illuminating light with uniform color, allowing a uniformly bright projected image with uniform color to be formed over the entire projection surface.

The above-described projector may further include a color light separation optical system for separating light emitted from the illuminating optical system into at least two types of color light beams, a plurality of the electro-optical devices for modulating each of the types of color light beams separated by the color light separation optical system, and a color light synthesizing optical system for synthesizing the modulated color light beams after modulation by each of the electro-optical devices. The synthesized color light beam obtained by the color light synthesizer may be projected through the projection optical system. When the projector is constructed in this way, it is possible to project and display brighter and more uniform color images than has been conventionally possible.

BRIEF DESCRIPTION OF THE DRAWINGS

FIGS. 3(A)–3(F) illustrate a second lens array 50;

DETAILED DESCRIPTION OF PREFERRED EMBODIMENTS

A description will hereunder be given of each of the embodiments of the present invention, with reference to the drawings. It is to be noted that in the description of each of the embodiments, unless otherwise specified, the direction of propagation of light is defined as the z-axis direction (which is parallel to the optical axis), the direction in which the hand of a clock points when it is 12 o'clock as viewed from the z-axis direction is defined as the y-axis direction (vertical direction), and the direction in which the hand of a clock points when it is 3 o'clock as viewed from the z-axis direction is defined as the x-axis direction (horizontal direction).

Figure 1:
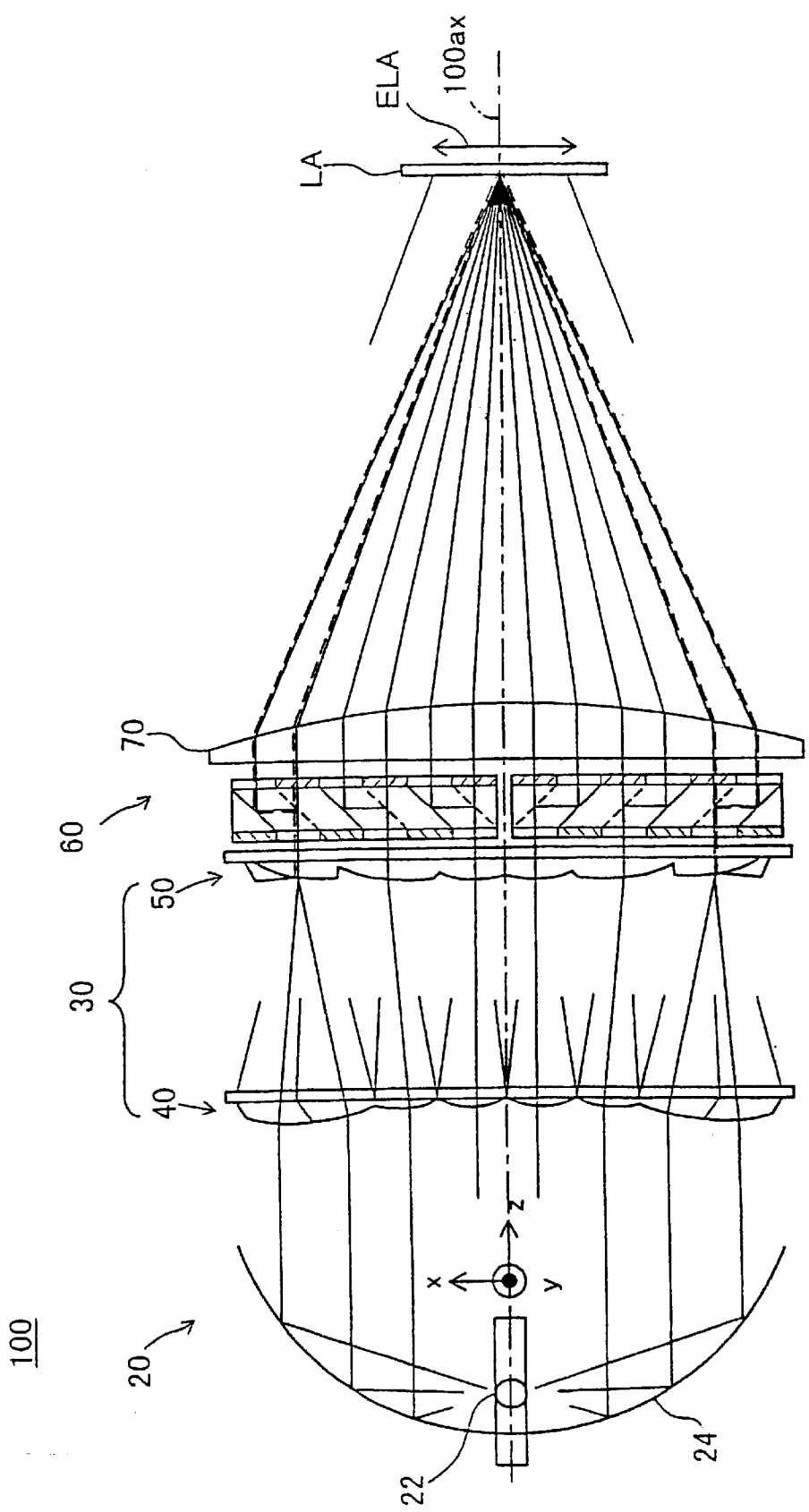
FIG. 1 is a schematic structural view as seen in a plane of the main portion of an illuminating optical system of the present invention.

FIG. 1 is a schematic structural view as viewed in a plane of the main portion of an illuminating optical system of the present invention. The illuminating optical system 100 includes a light source 20, a separation optical system 30, a polarization conversion optical system 60, and a superimposing optical system (superimposing lens) 70. Each of the optical elements 20, 30, 60, and 70 is disposed so that its center axis coincides with a system optical axis 100a of the illuminating optical system 100. The separation optical system 30 and the superimposing optical system 70 form an integrator optical system for substantially uniformly illuminating an effective illumination area ELA of an illumination area LA.

The light source 20 comprises a light source lamp 22 acting as a light source which emits light radially, and a concave mirror 24 which causes light beams radially emitted from the light source lamp 22 to be formed substantially into parallel light beams. A high-pressure electric-discharge lamp, such as a high-pressure mercury lamp or a metal halide lamp is ordinarily used for the light source lamp 22. For the concave mirror 24, it is preferable to use a parabolic mirror. An ellipsoidal mirror, a spherical mirror, or the like may also be used instead of a parabolic mirror.

The separation optical system 30 includes a first lens array 40 and a second lens array 50. The first lens array 40 and the second lens array 50 have about the same width and height. The first lens array 40 functions to separate the substantially parallel light beams emitted from the light source 20 into a plural number of partial light beams and to condense the partial light beams in order to form images near the second lens array 50 and the polarization conversion optical system 60. The functions of the first lens array 40 are described below, along with the functions of the second lens array 50.

Figure 2A:
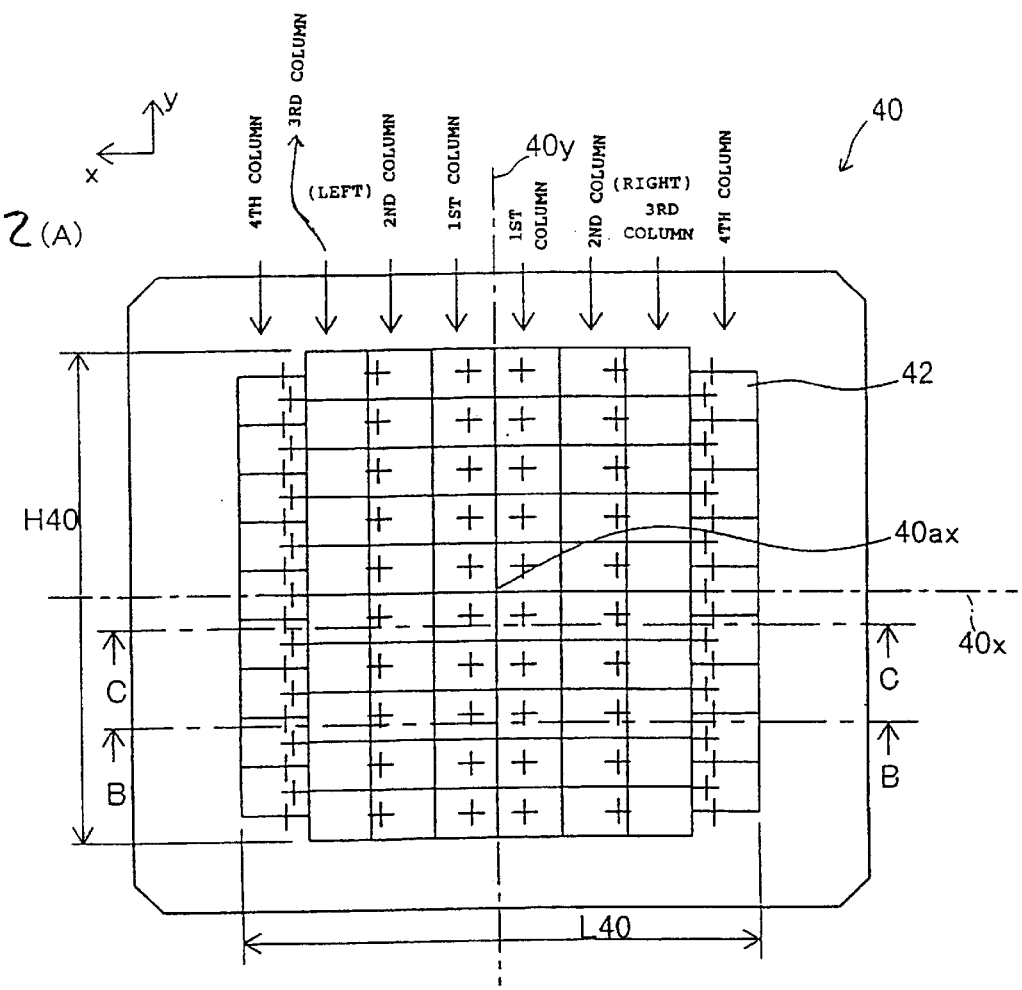
FIGS. 2(A)–2(C) illustrate a first lens array 40.
Figure 2B:
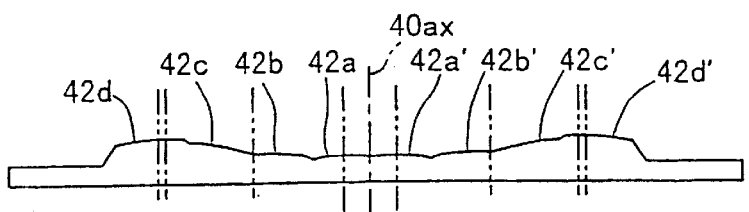
Figure 2C:
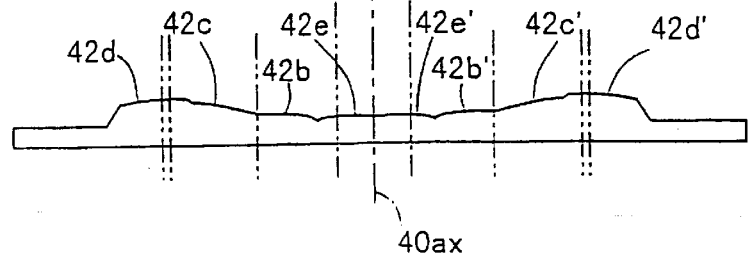

FIGS. 2(A)–2(C) illustrate the first lens array 40. FIG. 2(A) is a front view thereof as viewed from the light-incoming surface side. The first lens array 40 comprises plano-convex first small lenses 42 formed with a substantially rectangular contour and arranged without any space therebetween in a plurality of rows and columns. The number of small lenses in each column do not have to be the same. Here, a line passing through an optical axis 40ax and extending in the y-axis direction is defined as reference line 40y, while a line passing through the optical axis 40ax and extending in the x-axis direction is defined as reference line 40x. The first small lenses 42 are arranged in four columns each on the left and right sides of the reference line 40y as center (or in the ±x axis directions with respect to the reference line 40y as center). In each of the left first to third columns, ten first small lenses 42 are arranged in the vertical direction with the reference line 40x as center. In the left fourth column, nine first small lenses 42 are arranged without any space therebetween. Each first small lens 42 in the left fourth column is disposed in correspondence with a location between associated adjacent first lenses 42 in the left third column. What has been mentioned above concerning each of the left columns similarly applies to each of the right columns.

Ordinarily, the outside shape of each of the first small lenses 42 as viewed from the z-direction is substantially the same as the shape of the effective illumination area. For example, if a liquid crystal panel is used as illumination area, when the aspect ratio (or the ratio between the horizontal and vertical size) of the image-forming area or the effective illumination area is 4:3, it is preferable that the aspect ratio of the first small lenses 42 be 4:3.

The + sign shown in FIG. 2(A) represents the optical axis of each first small lens 42. The position of the optical axis in the y-axis direction of each first small lens 42 is set at the center of each first small lens 42. In contrast to this, the position of the optical axis in the x-axis direction of each first small lens 42 is set differently in accordance with the column in which each first small lens 42 is disposed.

FIG. 2(B) is a sectional view taken along line B—B of FIG. 2(A), while FIG. 2(C) is a sectional view taken along line C—C of FIG. 2(A). FIG. 2(B) is a sectional view of the rows other than the two rows at the center portion of the lens array of FIG. 2(A). (The two rows other than those in the center portion of the lens array are called peripheral rows.) FIG. 2(C) is a sectional view of the two rows at the center portion of the lens array of FIG. 2(A). (The rows at the center portion are called center rows.) As shown in FIG. 2(B), different decentering lenses 42a, 42b, 42c, and 42d disposed according to columns are used for the first small lenses 42 arranged on the left side of the reference line 40y in the x-axis direction. Symmetrical decentering lenses 42a', 42b', 42c', and 42d' which correspond with the small lenses 42a–42d are used for each of the first lenses 42 arranged on the right side of the reference line 40y.

As shown in FIG. 2(C), for the two first small lenses 42 disposed at the center portion of the first columns, decentering lenses 42e and 42e' which are shaped differently from the decentering lenses 42a and 42a' disposed at the center portion of FIG. 2(B) are used. The optical axis of each decentering lens 42e is displaced in the +x-axis direction from the optical axis of its associated decentering lenses 42a, while the optical axis of each decentering lens 42e' is displaced in the −x-axis direction from the optical axis of its associated decentering lenses 42a'. Different decentering lenses are provided in the same columns for the following reason. An image formed by light which passes through the decentering lenses 42e and 42e' in the center rows and which is gathered and concentrated near the optical axis 40ax tends to be tilted towards the reference line 40y compared to an image formed by light which passes through the decentering lenses 42a and 42a' disposed in the peripheral rows. Therefore, dissimilar decentering lenses, such as those mentioned above, are used to correct this tilting, so that the images formed by light passing through the first small lenses 42 in each column substantially line up in a column.

FIGS. 3(A)–3(F) illustrate the second lens array 50. FIG. 3(A) is a front view as viewed from the light-incoming surface side. FIG. 3(B) is a bottom view, while FIG. 3(C) is a side view. FIG. 3(D) is a sectional view taken along line D—D of FIG. 3(A); FIG. 3(E) is a sectional view taken along line E—E of FIG. 3(A); and FIG. 3(F) is a sectional view taken along line F—F of FIG. 3(A).

The second lens array 50 comprises plano-convex second small lenses 52 having a substantially rectangular contour and arranged without any space therebetween in a plurality of rows and columns. The number of second small lenses 52 provided in the second lens array 50 is the same as the number of first small lenses 42 provided in the first lens array 40, so that each second small lens 52 is formed in correspondence with its associated first small lens 42. However, as described below, the small lenses of the second lens array 50 formed in correspondence with the small lenses in the third columns and the fourth columns in the first lens array 40 are disposed only in the third columns, that is, in only one column each. The height H50 of the lens array 50 in the vertical direction and the length L50 of the lens array 50 in the horizontal direction are substantially equal to the height H40 (see FIG. 2(A)) of the lens array 40 in the vertical direction and the length L40 of the lens array 40 in the horizontal direction, respectively. Here, the size of a lens array refers to the size obtained when all of the small lenses are arranged without any space therebetween in rows and columns, so that portions other than the small lenses are not included when defining the size of a lens array. A line which passes through optical axis 50ax and which extends in the y-axis direction is defined as reference line 50y, while a line which passes through the optical axis 50ax and which extends in the x-axis direction is defined as reference line 50x.

The second small lenses 52 are disposed in three columns each on the left and right sides of the reference line 50y as center (or in the ±x-axis directions with respect to the reference line 50y as center). The number of second small lenses 52 disposed in the left first column and the left second column in the second lens array 50 is the same as the number of first small lenses 42 disposed in the left first column and the left second column in the first lens array 40, respectively. In other words, five rows of second small lenses 52 each are arranged above and below the reference line 50x as center. In the left third column is disposed 19 second small lenses 52, which is equal to the sum of the number of first small lenses 42 arranged in the left third column and the left fourth column in the first lens array 40. The odd-numbered second small lenses 52 disposed in the left third column correspond to the first small lenses 42 disposed in the left third column in the first lens array 40. The even-numbered second small lenses 52 correspond to the first small lenses 42 disposed in the left fourth column in the first lens array 40.

The overall length of each left column in the y-axis direction is the same. However, the external form of each second small lens 52 as viewed from the z direction is adjusted so that it has a size large enough to include virtually the entire image formed by light condensed by its associated first small lens 42 of the first lens array 40. Each of the second small lenses 52 disposed in the left third column is smaller in the y-axis direction compared to the second small lenses 52 disposed in the other columns. It is to be noted that what applies to each of the left second small lenses 52 similarly applies to each of the right second small lenses 52 of the second lens array 50.

The + sign in FIG. 3(A) represents the optical axis of each second small lens 52. As shown in FIGS. 3(B)–3(F), the optical axis of each second small lens 52 is positioned at different locations depending on where each second small lenses 52 is disposed. The position of the optical axis of each second small lens 52 is discussed below in more detail.

The polarization conversion optical system 60 of FIG. 1 comprises a first polarization conversion optical system 60A and a second polarization conversion optical system 60B, with each of the partial light beams coming from the +x-axis direction side, with respect to the system optical axis 100ax as center, of the second lens array 40 being incident upon the first polarization conversion optical system 60A and each of the partial light beams coming from the −x-axis direction side being incident upon the second polarization conversion optical system 60B.

Figure 4A:
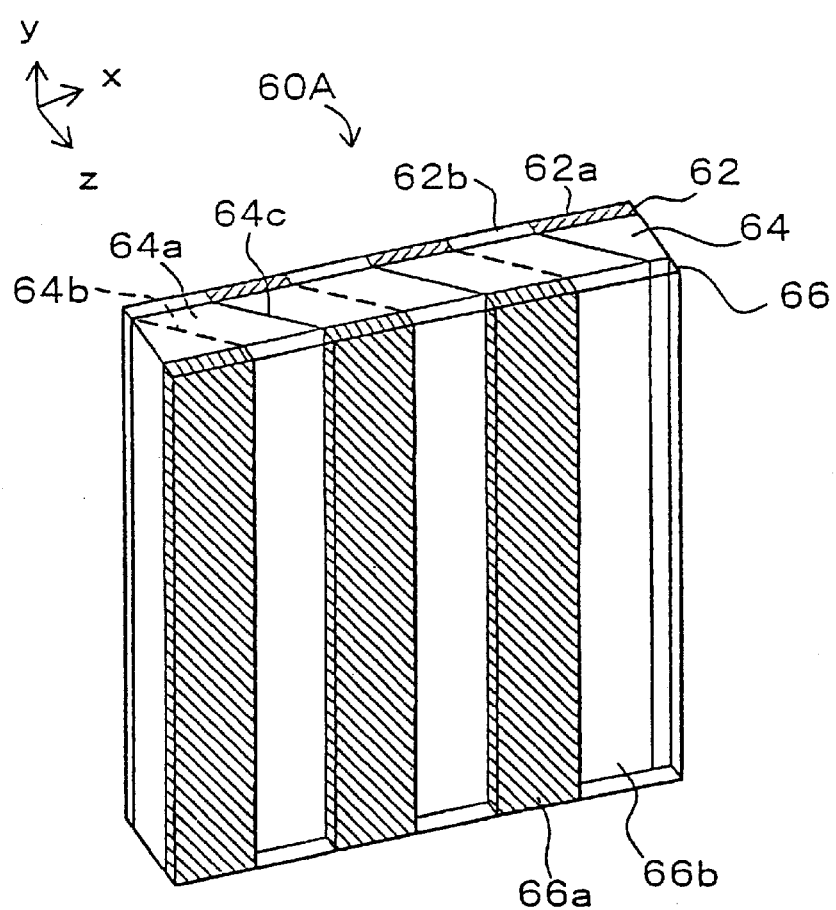
FIGS. 4(A) and 4(B) illustrate the structure of a first polarization conversion optical system 60A.
Figure 4B:
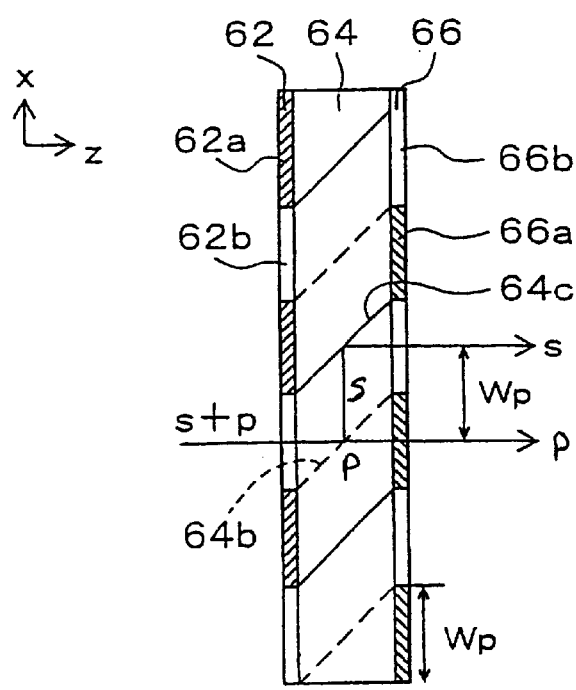

FIGS. 4(A) and 4(B) illustrate the structure of the first polarization conversion optical system 60A. FIG. 4(A) is a perspective view of the first polarization conversion optical system 60A, while FIG. 4(B) is an enlarged plan view of the first polarization conversion optical system 60A. The first polarization conversion optical system 60A comprises a light-shielding plate 62, a polarization beam splitter array 64, and a selective phase plate 66. The polarization beam splitter array 64 has a form obtained by alternately bonding a plurality of light transmissive plate members 64a shaped into a parallelogrammic column in section. A polarization separation film 64b and a reflective film 64c are alternately formed at each light transmissive metal member 64a interface. It is to be noted that the polarization beam splitter array 64 is formed by bonding together a plural number of plate glasses with these films formed thereon and cutting the bonded structure obliquely at a predetermined angle such that the polarization separation films 64b and the reflective films 64c are alternately disposed. Each polarization separation film 64b may be a dielectric multi-layered film, while each reflective film 64c may be either a dielectric multi-layered film or an aluminum film.

As shown in FIG. 4(A), in the light-shielding plate 62, a plurality of light-shielding surfaces 62a and a plurality of openings 62b are provided in a stripe-like form. Light incident upon a light-shielding surface of the light-shielding plate 62 is shielded, whereas light incident upon an opening 62b passes through the light-shielding plate 62. The light-shielding plate 62 functions to control the passage of light in accordance with locations on the light-shielding plate 62. The light-shielding surfaces 62a and the openings 62b of the light-shielding plate 62 are provided such that partial light beams coming from the second lens array 50 are only incident upon the polarization separation films 64b of the polarization beam splitter. array 64, and are not incident upon the reflective films 64c. More specifically, as shown in FIG. 4(B), they are provided such that the center of each opening 62b of the light-shielding plate 62 and the center of each polarization separation film 64b of the polarization beam splitter array 64 substantially coincide. The horizontal width (or the width in the x-axis direction) of the openings 62b is substantially equal to the width Wp in the x direction of each polarization separation film 64b. Therefore, a light-shielding surface 62a of the light-shielding plate 62 previously shields partial light beams which try to strike a reflective film 64c directly, without traveling to a polarization separation film 64b, there are almost no such partial light beams. In other words, most of the light beams which have passed through an opening 62b of the light-shielding plate 62 are incident only upon a polarization separation film 64b. The light-shielding plate 62 may consist of, as in the embodiment, a flat transmissive member (such as a glass plate) with a light-shielding film (such as a chromium film, an aluminum film, or a dielectric multi-layered film) partly formed thereon, or, for example, a light-shielding flat plate, such as an aluminum plate, with an opening formed therein.

An unpolarized light beam (indicated by a solid line in FIG. 4(B)) which has passed through an opening 62b of the light-shielding plate 62 is incident upon a polarization separation film 64b of the polarization beam splitter array 64, and is separated into two types of linearly polarized light beams (an s-polarized light beam and a p-polarized light beam). Most of the p-polarized light beam passes through the polarization separation film 64b. In contrast to this, most of the s-polarized light beam is reflected by a polarization separation film 64b, and is then reflected by a reflective film 64c. The s-polarized light beam leaves the reflective film 64c so as to be substantially parallel to the p-polarized light beam that has passed through the polarization separation film 64b, after traveling away from the p-polarized light beam by a distance Wp in the x-axis direction. A $\lambda/2$ phase layer 66a is formed at portions of the surface of the selective phase plate 66 where light which passes through a polarization separation film 64b leaves the selective phase plate 66, and an opening 66b is formed at portions of the surface of the selective phase plate 66 where light which is reflected by a reflective film 64c leaves the selective phase plate 66, that is, on the portions of the surface where the $\lambda/2$ phase layers 66a are not formed. Therefore, the p-polarized light beam which has passed through the polarization separation film 64b is converted into an s-polarized light beam by the $\lambda/2$ phase layer 66a, and this s-polarized light beam leaves the selective phase plate 66. As a result, most of the unpolarized light beam which has struck the first polarization conversion optical system 60A is converted into an s-polarized light beam, and this s-polarized light beam leaves the first polarization conversion optical system 60A. Obviously, when a $\lambda/2$ phase layer 66a is formed only at the portions of the surface of the selective phase plate 66 where light reflected by a reflective film 64c leaves the selective phase plate 66, most of the light beam can be converted into a p-polarized light beam, which leaves the selective phase plate 66. The polarization separation films 64b may be films which pass most of the s-polarized light therethrough and reflects most of the p-polarized light.

Here, when an unpolarized light beam directly strikes a reflective film 64c instead of a polarization separation film 64b, a p-polarized light beam, instead of an s-polarized light beam, leaves the first polarization conversion optical system 60A. As described above, in the present embodiment, light-shielding plate 62 is provided to prevent light from striking the reflective films 64c. Therefore, it is possible to eliminate the problem of an undesired linearly polarized light beam leaving the first polarization conversion optical system 60A after an unpolarized light beam has struck a reflective film 64c.

The structure of the second polarization conversion optical system 60B and the structure of the first polarization conversion optical system 60A are formed symmetrically with respect to the system optical axis 100ax acting as axis of symmetry. The functions of the second polarization conversion optical system 60B are similar to those of the first polarization conversion optical system 60A.

Figure 5:
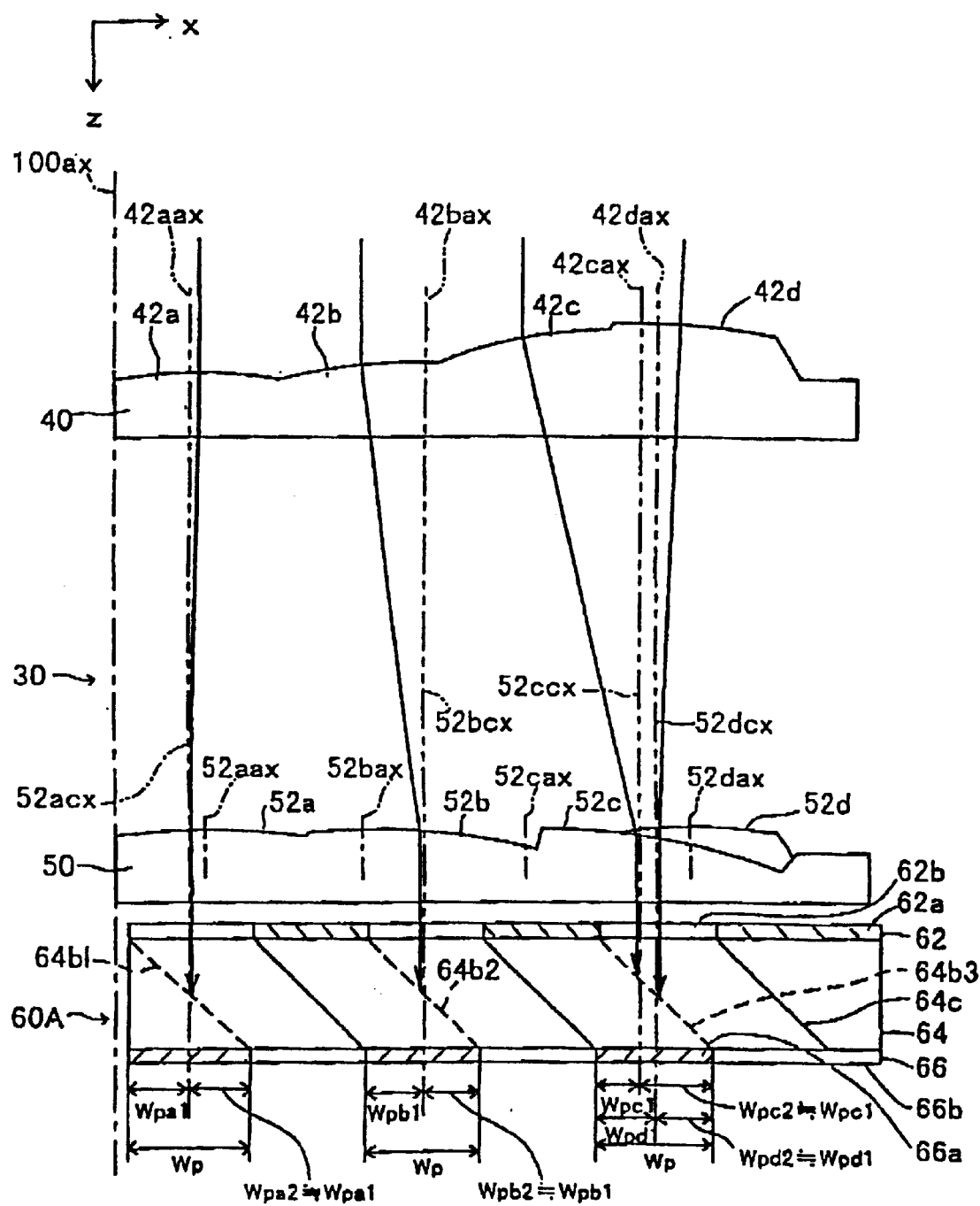
FIG. 5 illustrates the positional relationship among the first lens array 40, the second lens array 50, and the first polarization conversion optical system 60A.

FIG. 5 illustrates the positional relationship among the first lens array 40, the second lens array 50, and the first polarization conversion optical system 60A. It is a plan view as viewed from the upper surface side in the +x-axis direction from the system optical axis 100ax. Although the second lens array 50 is about the same size as the first lens array 40, it has one fewer column in the +x-axis direction than the first lens array 40 of FIGS. 2 and 3. Therefore, the width in the x-axis direction of second small lenses 52 (52a–52d) of the second lens array 50 is larger than the width in the x-axis direction of the first small lenses 42 (42a–42d) of the first lens array 40.

Therefore, decentering lenses whose optical axes are positioned at different locations are used for the first small lenses 42a–42d disposed in the first column to fourth column in the first lens array 40, so that they cause the partial light beams to be incident upon their corresponding second small lenses 52a–52d of the second lens array 50. Decentering lenses whose axes are positioned at different locations are also used for the second small lenses 52a–52d of the second lens array 50 corresponding to the first small lenses 42a–42d of the first lens array 40. As mentioned above, the second small lenses 52c disposed in correspondence with the third column in the first lens array 40 and the second small lenses 52d disposed in correspondence with the fourth column in the first lens array 40 are disposed in one column constituting the third column in the second lens array 50. More specifically, the second small lenses 52d and the second small lenses 52c are alternately disposed.

The small lenses 42a–42d in each column in the first lens array 40 are disposed such that their optical axes 42ax–42dx coincide with respective center axes 52acx–52dcx passing through the center of the external form of the second small lenses 52a–52d of the second lens array 50.

The center axis 52acx of each second small lens 52a in the first column in the second lens array 50 is positioned such that it virtually passes through the center in the x-axis direction of a polarization separation film 64b1 in the first column in the polarization conversion optical system 60A. The center axis 52bcx of each second small lens 52b in the second column is positioned such that it virtually passes through the center in the x-axis direction of a polarization separation film 64b2 in the second column in the polarization conversion optical system 60A. The center axis 52ccx of each second small lens 52c in the third column is positioned such that it virtually passes through the center in the x-axis direction of a polarization separation film 64b3 in the third column in the polarization conversion optical system 60A. The center axis 52dcx of each second small lens 52d in the third column is also positioned so that it virtually passes through the center in the x-axis direction of the polarization separation film 64b3 in the third column in the polarization conversion optical system 60A. The second small lenses 52c and 52d are positioned such that their respective center axes 52ccx and 52dcx are separated from each other in the y-axis direction. In FIG. 5, in order to easily distinguish between the two center axes 52ccx and 52dcx, the center axis 52ccx is positioned away from the center.

Each partial light beam which has left each of the first small lenses 42a to 42d of the first lens array 40 is deflected in accordance with the position of its optical axes 42ax to 42dx, and strikes its associated second small lenses 52a to 52d in the second lens array 50. The optical axes 52aax to 52dax of each of the second small lenses 52a to 52d are positioned such that the center axis of each of the partial light beams which has struck each of the second small lenses 52a to 52d is substantially parallel to the system optical axis 100ax.

Figure 6A:
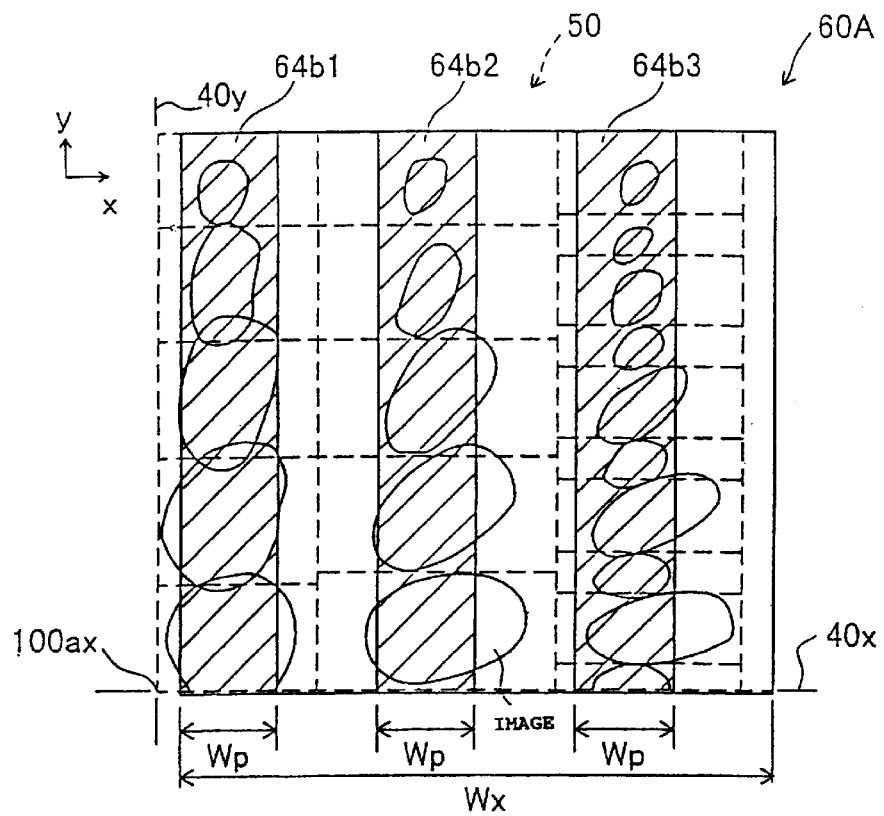
FIGS. 6(A) and 6(B) illustrate images formed by condensed light near polarization separation films 64b by the first lens array 40.
Figure 6B:
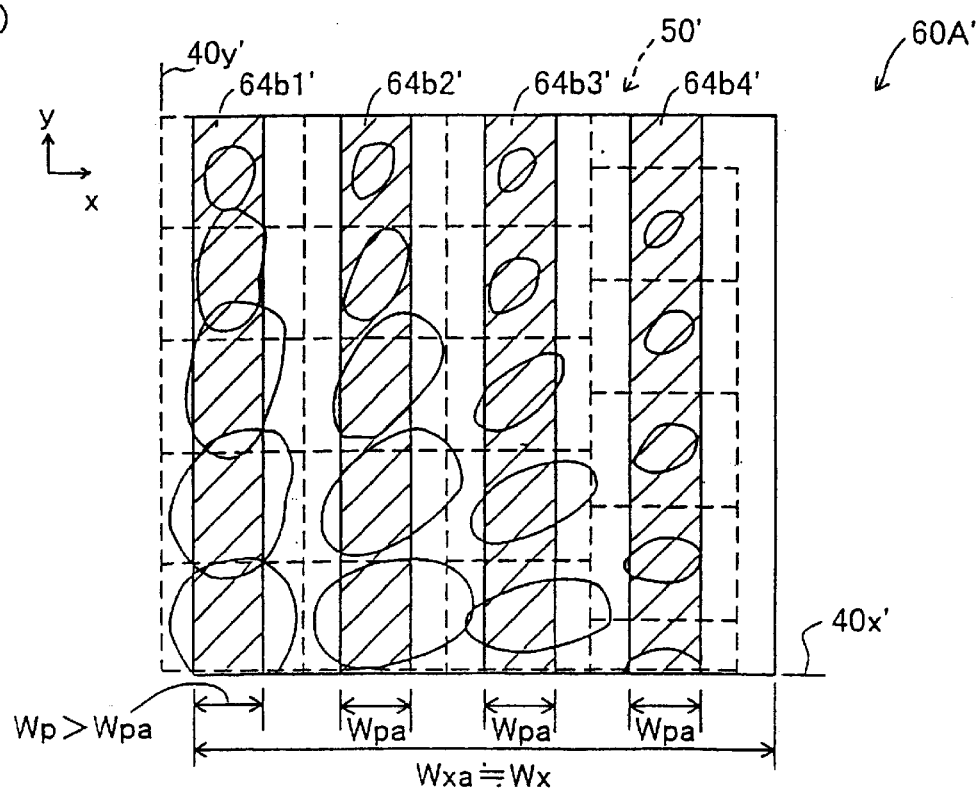

FIGS. 6(A) and 6(B) illustrate images formed by light condensed near the polarization separation films 64b, by the first lens array 40. FIG. 6(A) illustrates the relationship between images (closed curve figures) and the polarization separation films 64b of the polarization conversion optical system 60A upon which partial optical light beams fall, with the images being formed by condensed partial light beams separated by the lenses of the first lens array 40 located in the +y-axis direction from the reference line 40x and in the +x-axis direction from the reference line 40y. The figure drawn by broken lines indicates the position of the second lens array 50.

FIG. 6(B) illustrates the images formed by condensed light near polarization separation films 64b', by a first lens array 40' in the conventional illuminating optical system. Here, "conventional illuminating optical system" refers to an optical system in which concentric lenses, instead of decentering lenses, are arranged in the first lens array 40' and in a second lens array 50' in the manner shown in FIG. 2(A). The figure drawn by broken lines indicates the position of the second lens array 50'. The polarization conversion optical system 60A' comprises polarization separation films 64b1' to 64b4' equal in number to the number of columns in which the small lenses of the first lens array 40' are disposed.

As mentioned above, since the second lens array 50 and the polarization conversion optical system 60 of the present invention shown in FIG. 6(A) are ordinarily disposed without any space therebetween, it can be said that the light-outgoing surface of the second lens array 50 is virtually the same as the light-incoming surface of the polarization conversion optical system 60. Therefore, the x-axis direction width of each of the images formed by condensed light with respect to the x-axis direction width of each of the polarization separation films 64b of the polarization conversion optical system 60 can be thought of as indicating the efficiency with which each of the partial light beams strike the polarization conversion optical system 60. The same applies to FIG. 6(B).

As described in the conventional example section, the size of the polarization conversion optical system is determined by the optical elements, such as the projection optical system (projection lens), used in the projector, disposed at the back side of the illuminating optical system. Here, to compare the efficiency with which light is used in the polarization conversion optical systems, the x-axis direction width Wxa of the polarization conversion optical system 60A' and the x-axis direction width Wx of the polarization conversion optical system 60A are made substantially equal to each other. The first lens array 40' only differs from the first lens array 40 in that concentric lenses are used for the small lenses. Therefore, each of the images formed by light condensed by the first lens array 40' are substantially the same as the images formed by light condensed by the first lens array 40. As can be seen by comparing FIGS. 6(A) and 6(B), the polarization conversion optical system 60A' comprises four columns of polarization separation films 64b1'–64b4', while the polarization conversion optical system 60A comprises three columns of polarization separation films 64b1–64b3. Therefore, the x-axis direction width Wp of the polarization separation films 64b1–64b3 of the polarization conversion optical system 60A can be made larger than the x-axis direction width Wpa of the polarization separation films 64b1'–64b4' of the polarization conversion optical system 60A'. As a result, the x-axis direction width of each of the partial light beams which can strike each of the polarization separation films 64b1–64b3 of the polarization conversion optical system 60A can be made larger than the x-axis direction width of each of the partial light beams which can strike the polarization separation films 64b1'–64b4' of the polarization conversion optical system 60A'.

Since the x-axis direction width Wp of the polarization separation films 64b1–64b3 in FIG. 6(A) is larger than the x-axis direction width Wpa of the polarization separation films 64b1'–64b4' in FIG. 6(B), if the size of the images formed by condensed light are the same, the polarization conversion optical system 60A of FIG. 6(A) can perform polarization separation operations on a larger amount of light. Therefore, the polarization conversion optical system 60A of FIG. 6(A) performs polarization conversion operations on a larger amount of light, which leave therefrom.

From what has been mentioned above, in the illuminating optical system 100 of the present invention, the efficiency with which light strikes the polarization conversion optical system 60 can be made greater than that in the conventional illuminating optical system using a polarization conversion optical system of about the same size. This makes it possible to improve the efficiency with which light is used in the polarization conversion optical system.

The positional relationship among the first lens array 40, the second lens array 50, and the second polarization conversion optical system 60B is such that this positional relationship and the positional relationship among the first lens array 40, the second lens array 50, and the first polarization conversion optical system 60A are symmetrical with respect to the system optical axis 100ax.

The first lens array 40 separates the substantially parallel light beams emitted from the light source 20 of FIG. 1 into a plural number of partial light beams, and condenses the partial light beams, whereby images are formed near the second lens array 50 and the polarization conversion optical system 60. For making the explanation easier, in FIG. 1, the center axis of each of the partial light beams is indicated by a solid line or a broken line. Most of the partial light beams coming from the images formed by condensed light near the second lens array 50 are converted into one type of linearly-polarized light beams at the polarization conversion optical system 60. The partial light beams which have left the polarization conversion optical system 60 strike the superimposing optical system 70, which functions to substantially superimpose them on the effective illumination area ELA of the illumination area LA. As a result, the effective illumination area ELA is substantially uniformly illuminated mostly by one type of linearly polarized light beams.

The second lens array 50, the polarization conversion optical system 60, and the superimposing optical system 70 are disposed so that they are separated from one another. However, ordinarily, in order to reduce the loss of light at the interface at each of the second lens array 50, the polarization conversion optical system 60, and the superimposing optical system 70, it is preferable that they be bonded together with an adhesive, so that they are disposed in close contact with one other. It is possible to omit the superimposing optical system 70.

As described above, the illuminating optical system 100 of the embodiment can substantially uniformly illuminate the effective illumination area ELA of the illumination area LA. It also allows light to be used with greater efficiency compared to the conventional illuminating optical system.

Although in FIG. 1 the first lens array 40 is constructed by first small lenses 42 which are decentering lenses, the present invention is not limited thereto. For example, the following modifications are possible.

Figure 7A:
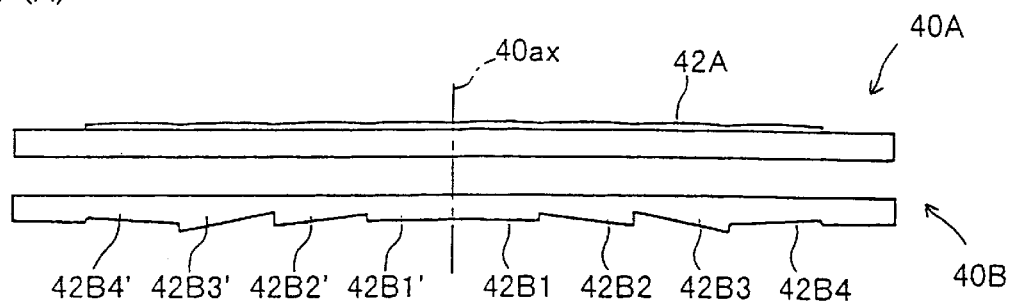
FIGS. 7(A)–7(D) illustrate modifications of the first lens array 40.

FIGS. 7(A)–7(D) illustrate modifications of the first lens array 40. FIG. 7(A) illustrates an example in which the first lens array 40 is replaced by two partial lens arrays 40A and 40B. The first partial lens array 40A comprises a plural number of first partial small lenses 42A which are concentric lenses. The first partial lens array 40A functions to separate the incident light into a plural number of partial light beams, and to condense the partial light beams. The second partial lens array 40B comprises a plural number of prisms 42B (42B1–42B4, and 42B1'–42B4'). The prisms 42B each have inclined surfaces with different inclinations. Because of this, the second partial lens array 40B functions to deflect the direction of propagation of each of the partial light beams leaving the first partial lens array 40A in accordance with the location of each of the partial light beams. The first partial lens array 40A and the second partial lens array 40B can have the same functions as the first lens array 40. The first partial lens array 40A and the second partial lens array 40B may be bonded together with an adhesive. Like the lens array 40E of FIG. 7(C), the first partial lens array 40A and the second partial lens array 40B may be formed into an integral structure.

Figure 7B:
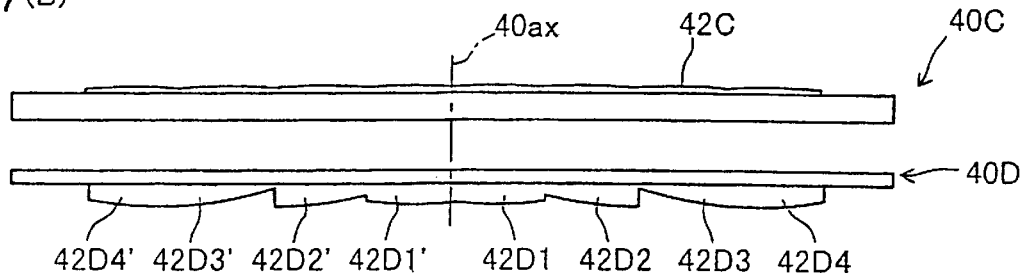
Figure 7C:
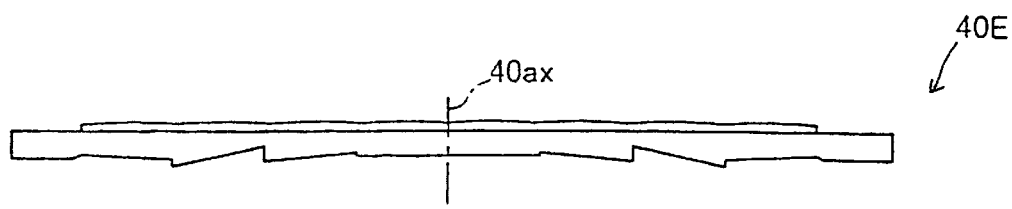
Figure 7D:
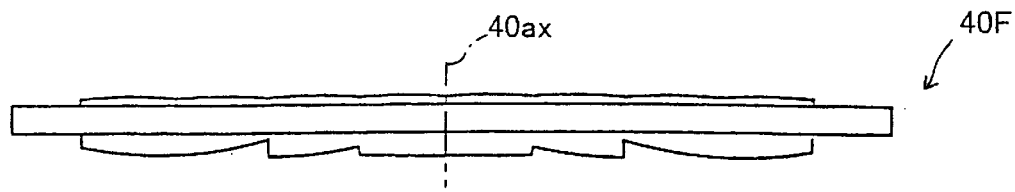

FIG. 7(B) illustrates an example in which the first lens array 40 is replaced by two partial lens arrays 40C and 40D. The first partial lens array 40C is constructed by a plural number of first partial small lenses 42C which are concentric lenses. The first partial lens array 40C functions to separate the incident light into a plural number of partial light beams, and to condense them. The focal length of each first partial small lens 42C is longer than that of each first partial small lens 42A of FIG. 7(A). The second partial lens array 40D comprises a plural number of second partial small lenses 42D (42D1–42D4, and 42D1'–42D4'). The second partial small lenses 42D are decentering lenses whose optical axes are positioned at different locations according to where they are disposed. Because of this, the second partial lens array 40D functions to deflect the direction of propagation of each partial light beam leaving the first partial lens array 40C in accordance with its location, and to condense each of the partial light beams. The total focal length equal to the sum of the focal length of each first partial small lens 42C and the focal length of its associated second partial small lens 42D is set so as to be substantially equal to the focal length of its associated first partial small lens 42A of FIG. 7(A). Therefore, the first partial lens array 40C and the second partial lens array 40D can have the same functions as the first lens array 40. The first partial lens array 40C and the second partial lens array 40D may be bonded together with an adhesive. Like the lens array 40F of FIG. 7(D), the first partial lens array 40C and the second partial lens array 40D may be formed into an integral structure.

The orientation of the lenses of the first lens array 40 is not limited to that shown in FIG. 1, so that the first lens array 40 may be disposed with the convex surface on the light-outgoing surface side thereof. The orientation of the lenses of the second lens array 50 is not limited to that shown in FIG. 1, so that the second lens array 50 may be disposed with the convex surface on the light-outgoing surface side. The orientation of the superimposing optical system 70 is not limited to that shown in FIG. 1, so that the convex surface may be disposed at the light-incoming surface side.

Although the above-described polarization conversion optical system 60 comprises two polarization conversion optical systems 60A and 60B, it may comprise one polarization conversion optical system.

Figure 8:
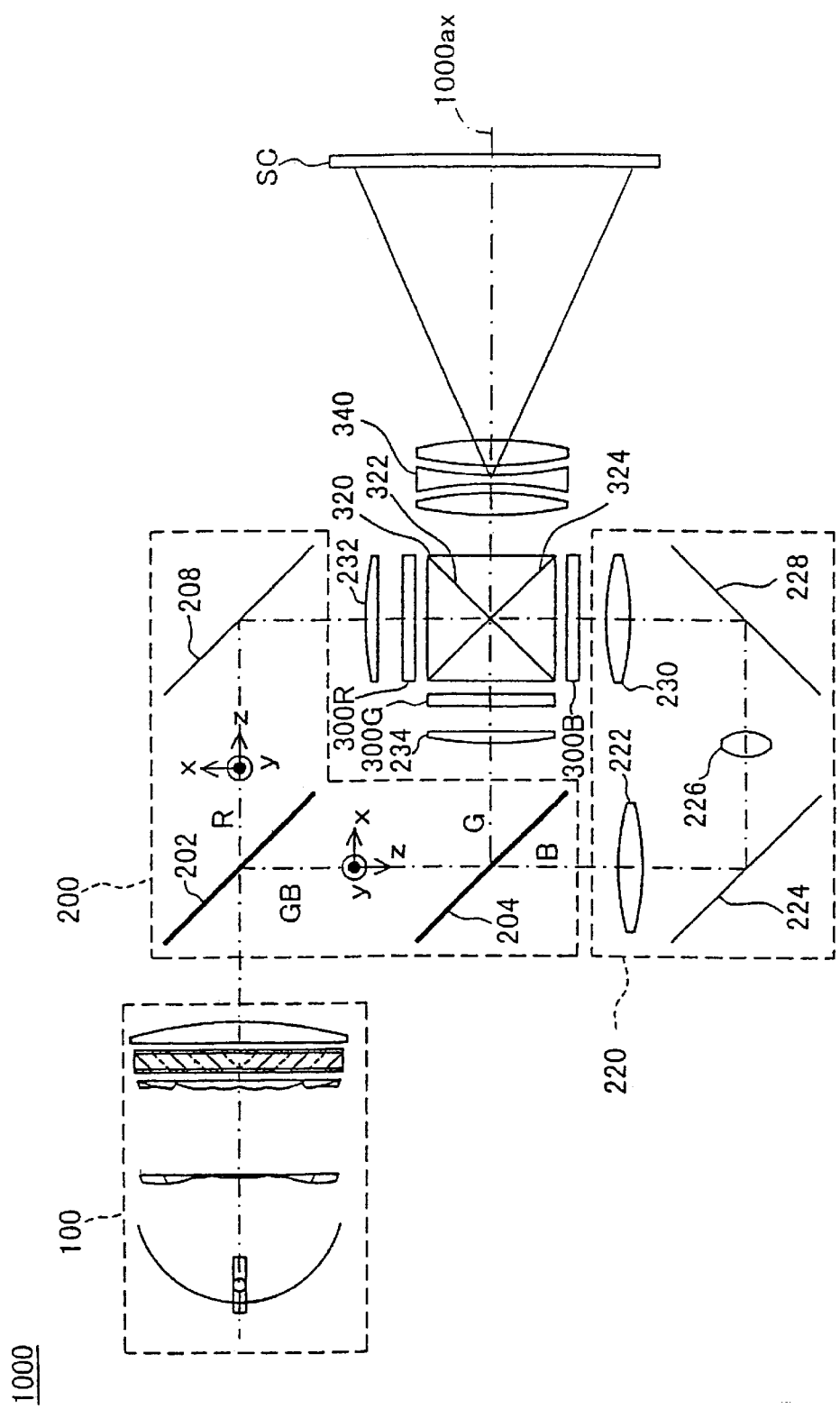
FIG. 8 is a schematic structural view as seen in a plane of the main portion of a projector using the illuminating optical system of the present invention.
Figure 9:
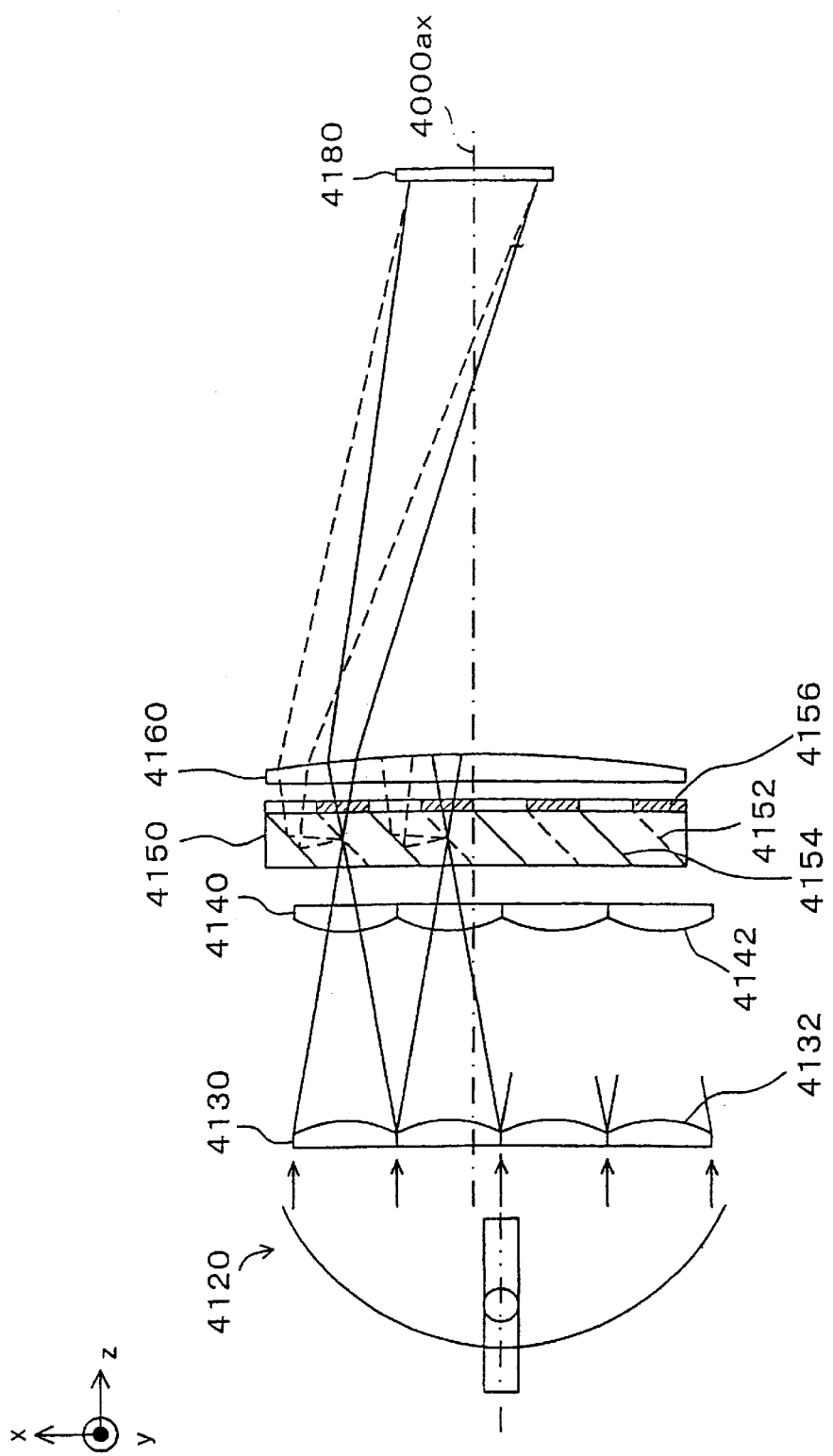
FIG. 9 is a schematic structural view of a conventional illuminating optical system.

FIG. 8 is a schematic structural view as seen in a plane of the main portion of a projector using the illuminating optical system of the present invention. Projector 1000 uses the illuminating optical system 100 of the present invention.

The projector 1000 includes an illuminating optical system 100, a color light separation optical system 200, a relay optical system 220, three liquid crystal light valves 300R, 300G, and 300B, a cross dichroic prism 320, and a projection optical system 340. In the projector 1000, light emitted from the illuminating optical system 100 is separated into three types of color light, red (R) light, green (G) light, and blue (B) light, by the color light separation optical system 200. Each type of color light passes through its associated liquid crystal light valve 300R, 300G, or 300B, and is modulated in correspondence with image information associated thereto. The modulated three types of color light are synthesized by the cross dichroic prism 320 in order to display an image on a screen SC through the projection optical system 340.

As described above, linearly polarized illuminating light (s-polarized light in the example above) whose polarization directions are aligned is emitted from the illuminating optical system 100, and illuminates the liquid crystal light valves 300R, 300G, and 300B, acting as illumination area 80. Each of the liquid crystal light valves 300R, 300G, and 300B is formed by a liquid crystal panel acting as electro-optical device and a polarizer disposed at the light-outgoing surface side of its associated liquid crystal panel. Each polarizer disposed at the light-incoming surface of its associated liquid crystal panel is provided to further increase the degree of polarization of the illuminating light, and is disposed so that the direction of polarization of the linearly polarized light emitted from the illuminating optical system 100 is set in the direction of its the polarization axis. When the polarizers are disposed in this manner, the purity (or degree of polarization) of the linearly polarized light beams contained in the illuminating light emitted from the illuminating optical system 100 can be increased. When the degree of polarization of the illuminating light emitted from the illuminating optical system 100 is very high, the above-described polarizers disposed at the light-incoming surface side can be omitted.

The color light separation optical system 200 includes two dichroic mirrors 202 and 204, and a reflective mirror 208, and functions to separate the light beams emitted from the illuminating optical system 100 into three types of color light, red light, green light, and blue light. The first dichroic mirror 202 passes therethrough the red light component of light emitted from the illuminating optical system 100, and reflects the blue light component and the green light component. The red light R which has passed through the first dichroic mirror 202 is reflected by the reflective mirror 208. The reflected red light R leaves it so as to travel towards the cross dichroic prism 320. The red light R which has left the color light separation optical system 200 passes through a field lens 232 and reaches the red color light liquid crystal light valve 300R. The field lens 232 converts each of the partial light beams emitted from the illuminating optical system 100 into light beams which are parallel to the center axis thereof. What has been mentioned above also applies to field lenses 234 and 230 disposed in front of the other liquid crystal light valves.

Of the blue light B and the green light G reflected by the first dichroic mirror 202, the green light G is reflected by the second dichroic mirror 204. It leaves the color light separation optical system 200 so as to travel towards the cross dichroic prism 320. The green light G which has left the color light separation optical system 200 passes through the field lens 234 and reaches the green color light liquid crystal light valve 300G. On the other hand, the blue light B which has passed through the second dichroic mirror 204 leaves the color light separation optical system 200 and impinges upon the relay optical system 220. The blue light B which has impinged upon the relay optical system 220 reaches the blue light liquid crystal light valve 330B via a light-incoming side lens 222, a relay lens 226, reflective mirrors 224 and 228, and the light-outing side lens (field lens) 230, in the relay optical system 220. Since the optical path for blue light B is longer than the optical paths for the other colors, a relay optical system is used for blue light B in order to prevent the efficiency with which light is used from being reduced. In other words, it is provided to transmit blue light which has struck the light-incoming side lens 222 to the light-outgoing side lens 230. The distance from the superimposing optical system 70 of the illuminating optical system 100 to the liquid crystal light valve 300R, that from the superimposing optical system 70 to the liquid crystal light valve 300G, and that from the superimposing optical system 70 to the light-incoming side lens 222 are set so that they are substantially equal.

The three liquid crystal light valves 300R, 300G, and 300B function as light-modulation unit for modulating each of the three types of color light in accordance with provided image information (image signals) in order to form an image. The cross dichroic prism 320 functions as a color light synthesizing optical system to synthesize the three types of color light modulated by the liquid crystal light valves 300R, 300G, and 300B in order to form a color image. In the cross dichroic prism 320, a red light reflective dichroic surface 321, formed by a dielectric multi-layered film which reflects red light, and a blue light reflective dichroic surface 322, formed by a dielectric multi-layered film which reflects blue light, are formed into a substantially X shape at the interfacial surfaces of four rectangular prisms. The three types of color light are synthesized by the red light reflective dichroic surface 321 and the blue light reflective dichroic surface 322 in order to form a synthesized light beam for projecting a color image. The synthesized light beam generated at the cross dichroic prism 320 leaves it so as to be directed towards the projection optical system 340. The projection optical system 340 projects the synthesized light beam which has left the cross dichroic prism 320 in order to display a color image on the screen SC. A telecentric lens can be used for the projection optical system 340.

By using the illuminating optical system 100 with a high polarization conversion efficiency, the projector 1000 allows light to be used with greater efficiency. This makes it possible to display a bright image.

The present invention is not limited to the above-described embodiments and modifications, so that it can be variously embodied without departing from the spirit and scope of the invention.

In the above-described illuminating optical system 100, of the images formed by condensing the partial light beams separated at the first lens array 40, the images formed by the lenses in the two leftmost columns and those formed by the lenses in the two right most columns are collected in one column each. However, the present invention is not limited thereto. For example, the images formed by condensing the partial light beams in three or more columns may be placed in one column. In addition, it is not necessary to collect the images formed by the lenses in the two leftmost columns and those formed by the lenses in the two rightmost columns in one column each. The images formed by the lenses in either the two leftmost columns or in the two rightmost columns may be collected into one column. Further, the images to be collected into one column do not have to be those formed by the lenses in the two outermost columns. Still further, the images formed by the lenses in three columns may be collected into two columns. In other words, in general, the partial light beams placed in columns by a plurality of small lens columns in the first lens array are collected into a smaller number of columns in order to make them strike the second lens array.

The projector 1000 to which the illuminating optical system 100 of the present invention is applied is a projector of the type which projects a color image using three liquid crystal panels (liquid crystal light valves), but the present invention is not limited thereto. The illuminating optical system of the present invention may be used in various other kinds of devices. For example, it is applicable to a projector for projecting a monochrome image or a color image using one liquid crystal panel. In addition, it is applicable to display devices other than projectors.

Although in the foregoing description the projector 1000 to which the illuminating optical system of the present invention is applied is a transmissive projector, it may be a reflective projector. Here, the transmissive projector is a type in which light is transmitted through an electro-optical device, whereas the reflective projector is a type in which light is reflected by an electro-optical device. An example of the reflective electro-optical device is the reflective liquid crystal panel. In the reflective projector, the cross dichroic prism can be used as a color light separation unit for separating light into three types of color light, red light, green light, and blue light, and as color light synthesizer for resynthesizing the modulated three types of color light in order to make the them leave therefrom in the same direction. When the present invention is applied to a reflective projector, virtually the same effects as those obtained when the present invention is applied to a transmissive projector can be obtained.

Although in the projector 1000 a liquid crystal panel is used as electro-optical device, the present invention is not limited thereto, so that any type of electro-optical device which uses a particular type of linearly polarized light as illuminating light may be used.

What is claimed is:

1. An illuminating optical system that illuminates a light-incoming surface acting as an illumination area of a predetermined optical device, the illuminating optical system comprising:

a light source that emits unpolarized light;

a separation optical system that separates the light emitted from the light source into a plurality of partial light beams; and a polarization conversion optical system that substantially converts the unpolarized partial light beams into one type of linearly polarized light beams whose polarization directions are aligned and causes the one type of linearly polarized light beams to leave therefrom, the separation optical system including a first lens array having a number of small lenses provided in M columns, M being an integer equal to or greater than 2, and a second lens array having a number of small lenses provided in N columns, N being an integer equal to or greater than 1 and less than M, the partial light beams formed at the M columns of small lenses in the first lens array being collected in a smaller number of columns such that the partial light beams collected at the M columns of small lenses in the first lens array are incident upon the N columns of small lenses in the second lens array.

2. The illuminating optical system according to claim 1, the number of small lenses in the first lens array being equal to the number of small lenses in the second lens array.

3. The illuminating optical system according to claim 1, the first lens array and the second lens array being approximately the same size.

4. The illuminating optical system according to claim 1, a plurality of the M columns of small lenses in the first lens array being disposed in correspondence with one column of the N columns of small lenses of the second lens array.

5. The illuminating optical system according to claim 1, the M columns of small lenses in the first lens array comprising a first column and a second column, the position of each small lens in the first column being separated from the position of an associated small lens in the second column in the column direction, and in one column of the N columns of small lenses in the second lens array corresponding to the first column and the second column of small lenses in the first lens array, first small lenses corresponding to the small lenses in the first column in the first lens array and second small lenses corresponding to the small lenses in the second column being alternately disposed.

6. A projector for projecting and displaying an image, the projector comprising:

the illuminating optical system of claim 1;

an electro-optical device having a light-incoming surface acting as the illumination area that modulates incident light from the illuminating optical system in accordance with image information; and a projection optical system that projects the modulated light obtained by the electro-optical device.

7. The projector according to claim 6, the number of small lenses in the first lens array being equal to the number of small lenses in the second lens array.

8. The projector according to claim 6, the first lens array and the second lens array being approximately the same size.

9. The projector according to claim 6, a plurality of the M columns of small lenses in the first lens array being disposed in correspondence with one column of the N columns of small lenses of the second lens array.

10. The projector according to claim 6, the M columns of small lenses in the first lens array comprising a first column and a second column, the position of each small lens in the first column being separated from the position of an associated small lens in the second column in the column direction, and in one column of the N columns of small lenses in the second lens array corresponding to the first column and the second column of small lenses in the first lens array, first small lenses corresponding to the small lenses in the first column in the first lens array and second small lenses corresponding to the small lenses in the second column being alternately disposed.

11. The projector according to claim 6 further comprising:

a color light separation optical system that separates light emitted from the illuminating optical system into at least two types of color light beams;

a plurality of the electro-optical devices that modulate each of the types of color light beams separated by the color light separation optical system; and a color light synthesizing optical system that synthesizes the modulated color light beams after modulation by each of the electro-optical devices, the synthesized color light beam obtained using a color light synthesizer being projected through the projection optical system.

12. A method for illuminating a light-incoming surface acting as an illumination area of a predetermined optical device using an illuminating optical system, the method comprising:

emitting unpolarized light using a light source;

separating the light emitted from the light source into a plurality of partial light beams using a separation optical system; and substantially converting the unpolarized partial light beams using a polarization conversion optical system, into one type of linearly polarized light beams whose polarization directions are aligned and causes the one type of linearly polarized light beams to leave therefrom, the separation optical system including a first lens array having a number of small lenses provided in M columns, M being an integer equal to or greater than 2, and a second lens array having a number of small lenses provided in N columns, N being an integer equal to or greater than 1 and less than M, the partial light beams formed at the M columns of small lenses in the first lens array being collected in a smaller number of columns such that the partial light beams collected at the M columns of small lenses in the first lens array are incident upon the N columns of small lenses in the second lens array.

13. The method according to claim 12, the number of small lenses in the first lens array being equal to the number of small lenses in the second lens array.

14. The method according to claim 12, the first lens array and the second lens array being approximately the same size.

15. The method according to claim 12, a plurality of the M columns of small lenses in the first lens array being disposed in correspondence with one column of the N columns of small lenses of the second lens array.

16. The method according to claim 12, the M columns of small lenses in the first lens array comprising a first column and a second column, the position of each small lens in the first column being separated from the position of an associated small lens in the second column in the column direction, and in one column of the N columns of small lenses in the second lens array corresponding to the first column and the second column of small lenses in the first lens array, first small lenses corresponding to the small lenses in the first column in the first lens array and second small lenses corresponding to the small lenses in the second column being alternately disposed.

* * * * *